(12) United States Patent
Katsumata

(10) Patent No.: US 8,681,258 B2
(45) Date of Patent: Mar. 25, 2014

(54) IMAGING SYSTEM, IMAGING APPARATUS, INTERCHANGEABLE LENS, METHOD OF CONTROLLING IMAGING SYSTEM, AND PROGRAM

(75) Inventor: Shiori Katsumata, Kanagawa (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 13/080,913

(22) Filed: Apr. 6, 2011

(65) Prior Publication Data

US 2011/0292238 A1 Dec. 1, 2011

(30) Foreign Application Priority Data

May 28, 2010 (JP) ................................ 2010-122232

(51) Int. Cl.
*G02B 13/16* (2006.01)
*H04N 5/225* (2006.01)
(52) U.S. Cl.
USPC ........... 348/335; 348/347; 348/360; 348/362; 348/363; 348/207.99
(58) Field of Classification Search
USPC ............. 348/360, 207.99, 335, 347, 362, 363
See application file for complete search history.

(56) References Cited

U.S. PATENT DOCUMENTS

| | | | | |
|---|---|---|---|---|
| 5,404,013 A | * | 4/1995 | Tajima | 250/332 |
| 5,732,288 A | * | 3/1998 | Muramatsu | 396/49 |
| 5,839,002 A | * | 11/1998 | Miyake et al. | 396/91 |
| 6,314,240 B1 | * | 11/2001 | Okawara | 396/81 |
| 8,159,542 B2 | * | 4/2012 | Honjo et al. | 348/208.4 |
| 2002/0127012 A1 | * | 9/2002 | Okawara | 396/81 |
| 2005/0128342 A1 | * | 6/2005 | Izukawa | 348/360 |
| 2006/0066747 A1 | * | 3/2006 | Tsuda | 348/360 |
| 2007/0058971 A1 | * | 3/2007 | Tsuda | 396/529 |
| 2008/0199169 A1 | * | 8/2008 | Yoshida | 396/95 |
| 2008/0199174 A1 | * | 8/2008 | Yoshida | 396/257 |
| 2009/0244325 A1 | * | 10/2009 | Honjo et al. | 348/231.99 |

FOREIGN PATENT DOCUMENTS

JP 2000-56379 2/2000

* cited by examiner

*Primary Examiner* — Antoinette Spinks
(74) *Attorney, Agent, or Firm* — Oblon, Spivak, McClelland, Maier & Neustadt, L.L.P.

(57) ABSTRACT

An imaging system includes: an imaging apparatus including a first communication section performing communication with an interchangeable lens, and a first control section making a transmission request of prediction information being state information on a state of a member included in the interchangeable lens and being the state information related to a state of the member after a predetermined time period to the interchangeable lens; and an interchangeable lens including a second communication section performing communication with the imaging apparatus, a calculation section obtaining the state information from the member and calculating the prediction information on the basis of the obtained state information and the predetermined time period, and a second control section controlling transmission of the calculated prediction information to the imaging apparatus.

10 Claims, 8 Drawing Sheets

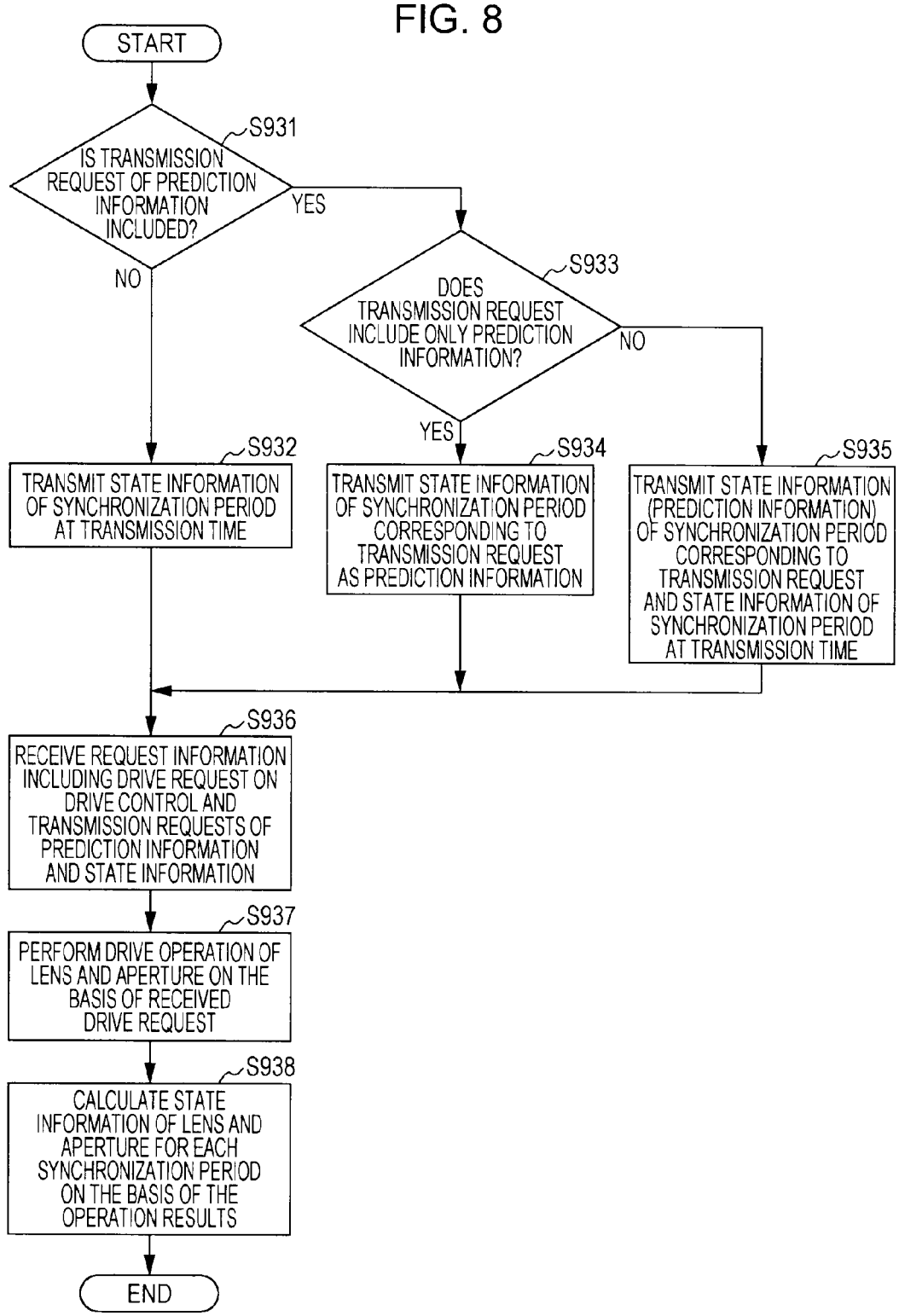

IMAGING SYSTEM, IMAGING APPARATUS, INTERCHANGEABLE LENS, METHOD OF CONTROLLING IMAGING SYSTEM, AND PROGRAM

BACKGROUND OF THE INVENTION

1. Field of the Invention

The present invention relates to an imaging system, particularly, to an imaging system performing communication between an interchangeable lens and an imaging apparatus, an imaging apparatus, an interchangeable lens, a method of controlling these, and a program for causing a computer to perform the method.

2. Description of the Related Art

In recent years, imaging apparatuses, such as a digital still camera, a digital video camera (for example, a camcorder), etc., have become widespread. The imaging apparatuses capture an image of a subject, such as a person, an animal, etc., generate image data, and record the image data as an image content. Also, imaging apparatuses capable of attaching various kinds of interchangeable lenses have become widespread. For example, a lens unit (interchangeable lens) including a zoom lens, a focus lens, etc., is allowed to be attached to and detached from the imaging apparatuses.

For example, when image-capture operation is performed using an imaging apparatus with an interchangeable lens attached (an imaging system including an interchangeable lens and an imaging apparatus), the imaging apparatus performs various kinds of operation processing, such as exposure, focusing, white balance, etc. In this manner, when the imaging apparatus performs various kinds of operation processing, the imaging apparatus uses image data generated by imaging processing and state information of each member, such as a position of each lens in the interchangeable lens, an aperture value (F number) of an aperture, etc. Accordingly, when image-capture operation is performed using an imaging apparatus to which an interchangeable lens is attached, it is necessary to perform communication between the interchangeable lens and the imaging apparatus. That is to say, the imaging apparatus obtains state information of each member in the interchangeable lens, and performs various kinds of operation processing using the obtained state information. And the imaging apparatus makes a drive request for driving each member in the interchangeable lens on the basis of these individual operation results to the interchangeable lens.

For example, a proposal has been made on an actuator control apparatus in which state information of an actuator is fetched on a predetermined control cycle, control parameters of the actuator are obtained on the basis of the information, and the control parameters are output on a predetermined control cycle (for example, refer to Japanese Unexamined Patent Application Publication No. 2000-56379 (FIG. 1).

SUMMARY OF THE INVENTION

By the above-described related-art technique, it is possible to output control-operation results with reduced variations in time in response to the obtained state information of the actuator.

Here, when image-capture operation is performed using an imaging apparatus, it is assumed that a subject that changes (a subject of interest moves or the entire scene changes) during the image-capture operation is to be shot. When a moving subject is to be shot in this manner, it becomes important to follow the change of the subject smoothly and promptly. In the same manner, when image-capture operation is performed using an imaging apparatus with an interchangeable lens attached, it becomes important to follow the change of the subject smoothly and promptly. Accordingly, it is important to efficiently perform communication processing between the interchangeable lens and the imaging apparatus, and to perform each operation processing using state information obtained thereby.

The present invention has been made in view of such circumstances. It is desirable to efficiently perform communication processing between an interchangeable lens and an imaging apparatus, and to efficiently perform each operation processing using the state information obtained thereby.

According to an embodiment of the present invention, there is provided an imaging system including: an imaging apparatus including a first communication section performing communication with an interchangeable lens, and a first control section making a transmission request of prediction information being state information on a state of a member included in the interchangeable lens and being the state information related to a state of the member after a predetermined time period to the interchangeable lens; and an interchangeable lens including a second communication section performing communication with the imaging apparatus, a calculation section obtaining the state information from the member and calculating the prediction information on the basis of the obtained state information and the predetermined time period, and a second control section controlling transmission of the calculated prediction information to the imaging apparatus. Also, according to the embodiment of the present invention, there is provided a method of controlling the imaging system, and a program for causing a computer to perform the method. Thereby, a transmission request of prediction information is made to the interchangeable lens, state information is obtained from a member included in the interchangeable lens, prediction information is calculated on the basis of the obtained state information and a predetermined time period related to the prediction information, and the calculated prediction information is advantageously transmitted to the imaging apparatus.

Also, in the above-described embodiment, the imaging apparatus may further include an operation processing section performing operation processing for controlling the member on the basis of image data generated by an imaging section and the state information, and the first control section may determine the predetermined time period on the basis of timing of the operation processing and receiving timing of the prediction information, and may make a transmission request of the prediction information related to the determined predetermined time period and a drive request for controlling the member on the basis of an operation result by the operation processing. Thereby, a predetermined time period is determined on the basis of timing of operation processing and receiving timing of the prediction information, a transmission request of the prediction information related to the determined predetermined time period and a drive request for controlling the member on the basis of an operation result of the operation processing are advantageously made to the interchangeable lens.

Also, in the above-described embodiment, the first communication section and the second communication section may perform synchronous communication. Thereby, a transmission request of the prediction information is made by synchronous communication from the imaging apparatus to the interchangeable lens, and the prediction information is advantageously transmitted from the interchangeable lens to the imaging apparatus.

Also, in the above-described embodiment, time information including the predetermined time period may be transmitted from the imaging apparatus to the interchangeable lens by initialization processing by the imaging apparatus and the interchangeable lens, and the calculation section may calculate the prediction information on the basis of the obtained state information and the predetermined time period included in the transmitted time information. Thereby, time information including the predetermined time period is transmitted from the imaging apparatus to the interchangeable lens by initialization processing, the prediction information is advantageously calculated on the basis of the state information obtained from the member included in the interchangeable lens and the predetermined time period included in the transmitted time information.

Also, in the above-described embodiment, the first control section may determine whether to make a transmission request of the prediction information or to make a transmission request of the state information on the basis of timing of the operation processing in a synchronization period of the synchronous communication and receiving timing of the prediction information, and may make a transmission request of the prediction information or the state information on the basis of the determination result, and the second control section may control to transmit the calculated prediction information or the obtained state information to the imaging apparatus in response to the transmission request of the imaging apparatus. Thereby, a determination is made of whether to make a transmission request of the prediction information or to make a transmission request of the state information on the basis of timing of the operation processing in a synchronization period of the synchronous communication and receiving timing of the prediction information, a transmission request is made of the prediction information or the state information on the basis of the determination result, and the interchangeable lens advantageously transmits the prediction information or the state information to the imaging apparatus in response to the transmission request from the imaging apparatus.

Also, in the above-described embodiment, the first communication section and the second communication section may perform synchronous communication, the imaging apparatus may further include a first operation processing section starting first operation processing on image data generated by the imaging section before receiving timing of the prediction information using the state information in a synchronization period by synchronous communication, and a second operation section starting second operation processing on the image data after the receiving timing of the prediction information using the state information in a synchronization period by the synchronous communication, the first control section may make a transmission request of prediction information being the state information related to a synchronization period of one period ahead as a transmission request for obtaining the state information to be used in the first operation processing, and may make a transmission request for obtaining the state information to be used in the second operation processing, and the second control section may control to transmit the calculated prediction information in response to the transmission request from the imaging apparatus and the obtained state information to the imaging apparatus. Thereby, a transmission request is made of the state information (prediction information) related to a synchronization period of one period ahead as a transmission request for obtaining the state information to be used for the first operation processing, and a transmission request is made for obtaining the state information to be used for the second operation processing. The interchangeable lens advantageously transmits the prediction information and the state information to the imaging apparatus in response to the transmission request from the imaging apparatus.

Also, in the above-described embodiment, the first operation processing section may perform auto-exposure operation processing as the first operation processing, and the second operation processing section may perform at least one of auto-focus operation processing and auto-white-balance operation processing. Thereby, auto-exposure operation processing is performed as the first operation processing, and at least one of auto-focus operation processing and auto-white-balance operation processing is advantageously performed as the second operation processing.

Also, in the above-described embodiment, the interchangeable lens may include a focus lens and an aperture as the member, and the first control section may make at least one request of state information on a position of the focus lens after the predetermined time period and state information on an aperture value of the aperture after the predetermined time period as the prediction information. Thereby, at least one transmission request is advantageously made of state information on the focus lens and state information on an aperture value of the aperture after a predetermined time period as prediction information.

According to another embodiment of the present invention, there is provided an imaging apparatus including: a communication section performing communication with an interchangeable lens to be connected; an imaging section capturing an image of a subject and generating image data; an operation processing section performing operation processing on the generated image data using state information on a state of a member included in the interchangeable lens and received from the interchangeable lens; and a control section making a transmission request of prediction information being the state information to be used for the operation processing and the state information related to a state of the member after a predetermined time period and making a drive request for controlling the member on the basis of an operation result of the operation processing. Also, according to the embodiment of the present invention, there is provided a method of controlling the imaging apparatus, and a program for causing a computer to perform the method. Thereby, a transmission request is advantageously made of prediction information to be used for the operation processing on the image data generated by the state information received from the interchangeable lens to the interchangeable lens, and a drive request is made in order to control the member included in the interchangeable lens on the basis of the operation result by the operation processing to the interchangeable lens.

According to another embodiment of the present invention, there is provided an interchangeable lens including: a member including a lens and an aperture; a communication section performing communication with an imaging apparatus to be connected, and receiving a transmission request of prediction information being state information on a state of the member and being the state information related to a state of the member after a predetermined time period; a calculation section obtaining the state information from the member and calculating the prediction information on the basis of the obtained state information and the predetermined time period; and a control section controlling transmission of the calculated prediction information to the imaging apparatus. Also, according to the embodiment of the present invention, there is provided a method of controlling the interchangeable lens, and a program for causing a computer to perform the method. Thereby, when a transmission request of prediction information is received from the imaging apparatus, state information is obtained from the members including a lens and an aperture, the prediction information is calculated on the basis of the obtained state information and a predetermined time period related to the prediction information, and the calculated prediction information is advantageously transmitted to the imaging apparatus.

By the present invention, it is possible to efficiently perform communication processing between the interchangeable lens and the imaging apparatus, and to efficiently perform each operation processing using the obtained state information thereby.

BRIEF DESCRIPTION OF THE DRAWINGS

FIG. 8 is a flowchart illustrating an example of a processing procedure of communication processing by an interchangeable lens according to the first embodiment of the present invention with an imaging apparatus.

DESCRIPTION OF THE PREFERRED EMBODIMENTS

In the following, descriptions will be given of modes for carrying out the present invention (hereinafter referred to as embodiments).

The descriptions will be given in the following order.

1. First embodiment (communication control: an example of obtaining suitable state information (prediction information) in accordance with operation processing timing and receiving timing of state information used for the processing in a synchronous period)

2. Second embodiment (communication control: an example of obtaining suitable state information (prediction information) in accordance with operation processing timing and receiving timing of state information used for the processing)

1. First Embodiment

Example of Internal Configuration of Imaging System

Figure 1:
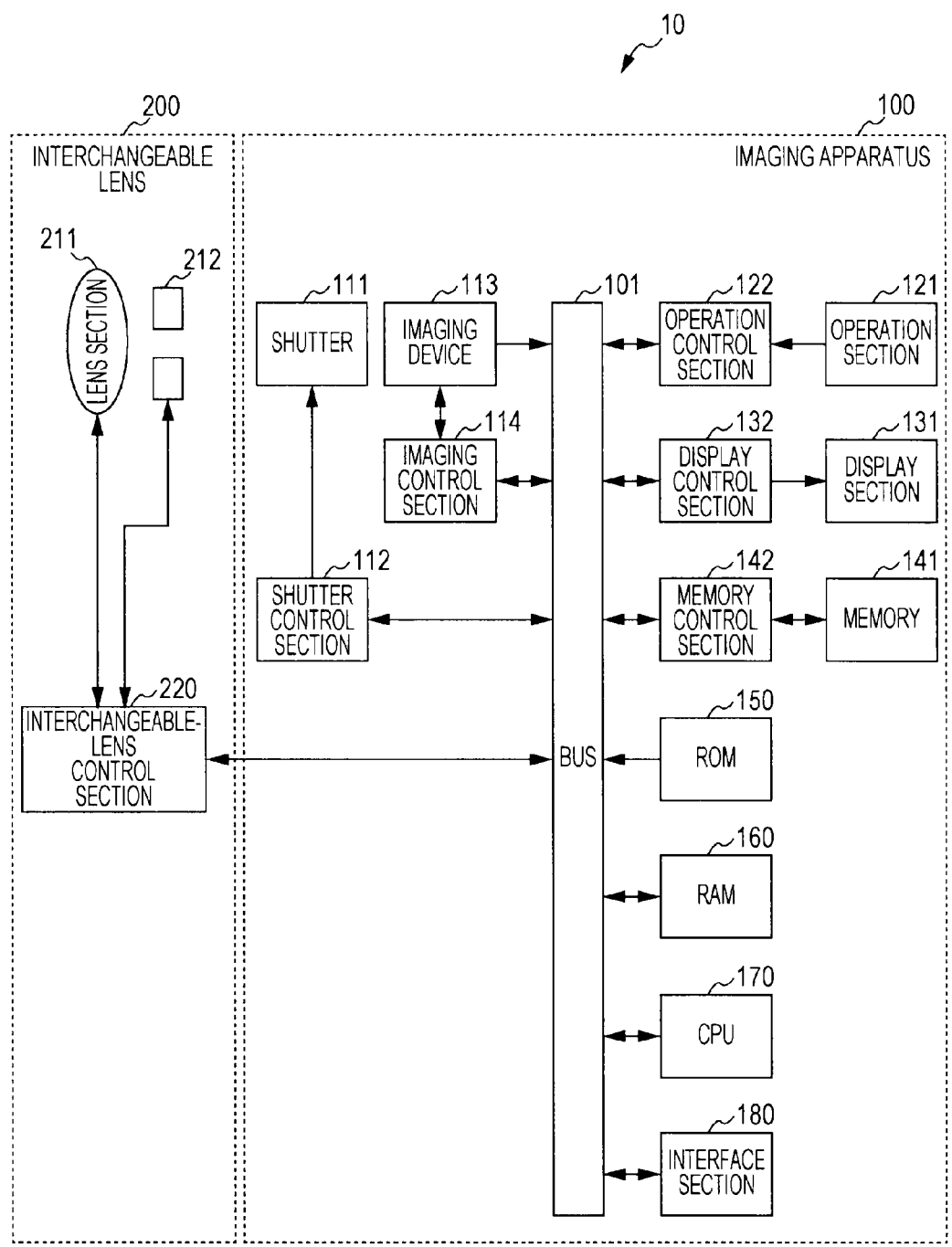
FIG. 1 is a block diagram illustrating an example of an internal configuration of an imaging system according to a first embodiment of the present invention.

FIG. 1 is a block diagram illustrating an example of an internal configuration of an imaging system 10 according to a first embodiment of the present invention. The imaging system 10 includes an imaging apparatus 100 and an interchangeable lens 200. The imaging system 10 is achieved, for example by a digital still camera capable of exchanging lenses (for example, a digital single-lens camera).

The imaging apparatus 100 is an imaging apparatus that captures an image of a subject to generate image data (a captured image), and records the generated image data as an image content (a still image content or a moving image content). Also, an interchangeable lens 200 can be attached to the imaging apparatus 100 through a lens mount (not shown in the figure).

The interchangeable lens 200 is an interchangeable lens unit that is attached to the imaging apparatus 100 through a lens mount (not shown in the figure). The interchangeable lens 200 includes a lens section 211, an aperture 212, and an interchangeable-lens control section 220.

The lens section 211 is a lens group condensing incident light from a subject, and the condensed light enters into an imaging device 113. In this regard, the lens section 211 includes a focus lens for focusing, a zoom lens for expanding the subject, etc. Also, each lens included in the lens section 211 is controlled by the interchangeable-lens control section 220 to achieve a zoom function, a focus function, etc.

The aperture 212 adjusts the amount of incident light passing through the lens section 211, and the adjusted light enters into the imaging device 113. Also, the aperture 212 is controlled by the interchangeable-lens control section 220.

The interchangeable-lens control section 220 performs communication processing of various kinds of information with the imaging apparatus 100, and controls each section (the lens section 211 and the aperture 212) included in the interchangeable lens 200 on the basis of the communication result. In this regard, a detailed description will be given of the configuration of the interchangeable-lens control section 220 with reference to FIG. 2.

The imaging apparatus 100 includes a bus 101, a shutter 111, a shutter control section 112, an imaging device 113, an imaging control section 114, an operation section 121, an operation control section 122, a display section 131, and a display control section 132. Also, the imaging apparatus 100 includes a memory 141, a memory control section 142, a ROM (Read Only Memory) 150, and a RAM (Random Access Memory) 160. Also, the imaging apparatus 100 includes a CPU (Central Processing Unit) 170, and an interface section 180. In this regard, the bus 101 is a system bus, and individual sections included in the imaging apparatus 100 are connected through the bus 101 so that the sections can communicate with each other.

The shutter 111 is a shutter that physically blocks incident light onto the imaging device 113 under the control of the shutter control section 112. That is to say, the shutter 111 adjusts the amount of light by letting in or shutting out incident light onto the imaging device 113. In this regard, in the first embodiment of the present invention, an example is shown of a shutter physically blocking incident light on the imaging device 113. However, an electronic shutter capable of achieving the same function as this shutter may be used.

The shutter control section 112 controls the shutter 111 under the control of the CPU 170.

The imaging device 113 converts an optical image of the subject (subject image) formed on a light receiving surface by the incident light through the lens section 211 and the aperture 212 into an electronic signal for each pixel under the control of the imaging control section 114, and outputs an image signal (image data) for one screen. The image signal output from the imaging device 113 is subjected to various kinds of image processing through the bus 101. Also, various kinds of operation processing are performed using the image signal output from the imaging device 113. For this operation processing, for example, AF (Auto Focus) operation processing, AE (Automatic Exposure) operation processing, and AWB (Auto White Balance) operation processing are performed. In this regard, if all of or a part of the image data stored in the imaging device can be read out under the control of the imaging control section 114, it is possible to use various modes as a storage mode and a read-out mode of the imaging device. Also, for the imaging device 113, for example, a CCD (Charge Coupled Device) sensor, a CMOS (Complementary Metal Oxide Semiconductor) sensor, etc., can be used.

The imaging control section 114 controls imaging processing and output processing by the imaging device 113 under the control of the CPU 170. Specifically, the imaging control section 114 generates a timing signal (for example, a drive timing signal necessary for the imaging device 113 storing and reading the image signal for each one screen) for performing imaging control, and supplies the generated timing signal to the imaging device 113. When various timing signals are supplied to the imaging device 113, the imaging device 113 uses the signals as timing signals of the imaging processing of the image signals and the output processing.

The operation section 121 includes an operation member, such as a button for performing various kinds of operations, etc., and is an operation section accepting an operation input from a user. The operation section 121 outputs the contents of the accepted operation input to the CPU 170 through the operation control section 122. That is to say, the operation section 121 is an interface for reflecting a request from the user to the imaging apparatus 100. In this regard, in addition to an operation member, such as a button, etc., disposed on the outer surface of the imaging apparatus 100, a touch panel may be disposed on the display section 131, and an operation input from the user may be accepted by the touch panel.

The operation control section 122 performs control on the operation input accepted by the operation section 121 under the control of the CPU 170.

The display section 131 is a display section displaying an image corresponding to various kinds of the image data supplied from the display control section 132. Also, the display section 131 supplies information accompanied with an image to be displayed, etc., together with the image. The display section 131 displays in sequence, for example, the image data (captured image) output from the imaging device 113, and having been subjected to various kinds of image processing. Also, the display section 131 displays an image corresponding to an image file stored in the memory 141, for example. In this regard, for the display section 131, for example, a display panel, such as an organic EL (Electro Luminescence) panel, an LCD (Liquid Crystal Display), etc., can be used. Also, for example, a touch panel that allows the user to perform operation input by touching the display screen by his or her finger or bringing the finger close to the display screen may be used.

The display control section 132 displays various kinds of image data on the display section 131 under the control of the CPU 170.

The memory 141 is a nonvolatile storage device recording image data, etc., under the control of the memory control section 142. For example, the image data, which has been output from the imaging device 113 and has been subjected to various kinds of image processing, is recorded in the memory 141 as an image file (a still image file or a moving image file). In this regard, the memory 141 may be detachable from the imaging apparatus 100, or may be fixed or included in the imaging apparatus 100. Also, for the memory 141, for example, the other storage medium, such as a semiconductor memory, a magnetic disk, an optical disc, etc., can be used.

The memory control section 142 performs memory control, such as reading data from the memory 141, or writing data into the memory 141 under the control of the CPU 170.

The ROM 150 is a nonvolatile memory storing programs performed by the CPU 170, software, data, etc.

The RAM 160 is a volatile memory holding data temporarily to be held and rewritable data when the CPU 170 operates.

The CPU 170 controls each section of the imaging apparatus 100 on the basis of the programs, software, etc., stored in the ROM 150. That is to say, the CPU 170 executes the programs, the software, etc., so as to totally control components capable of communication through the bus 101. In this regard, a detailed description will be given of a functional configuration of the CPU 170 with reference to FIG. 2.

The interface section 180 is, for example, an interface to be connected to an external device (for example, a personal computer), and for exchanging various kinds of information with the external device of the connection destination.

Example of Functional Configuration of Imaging System

Figure 2:
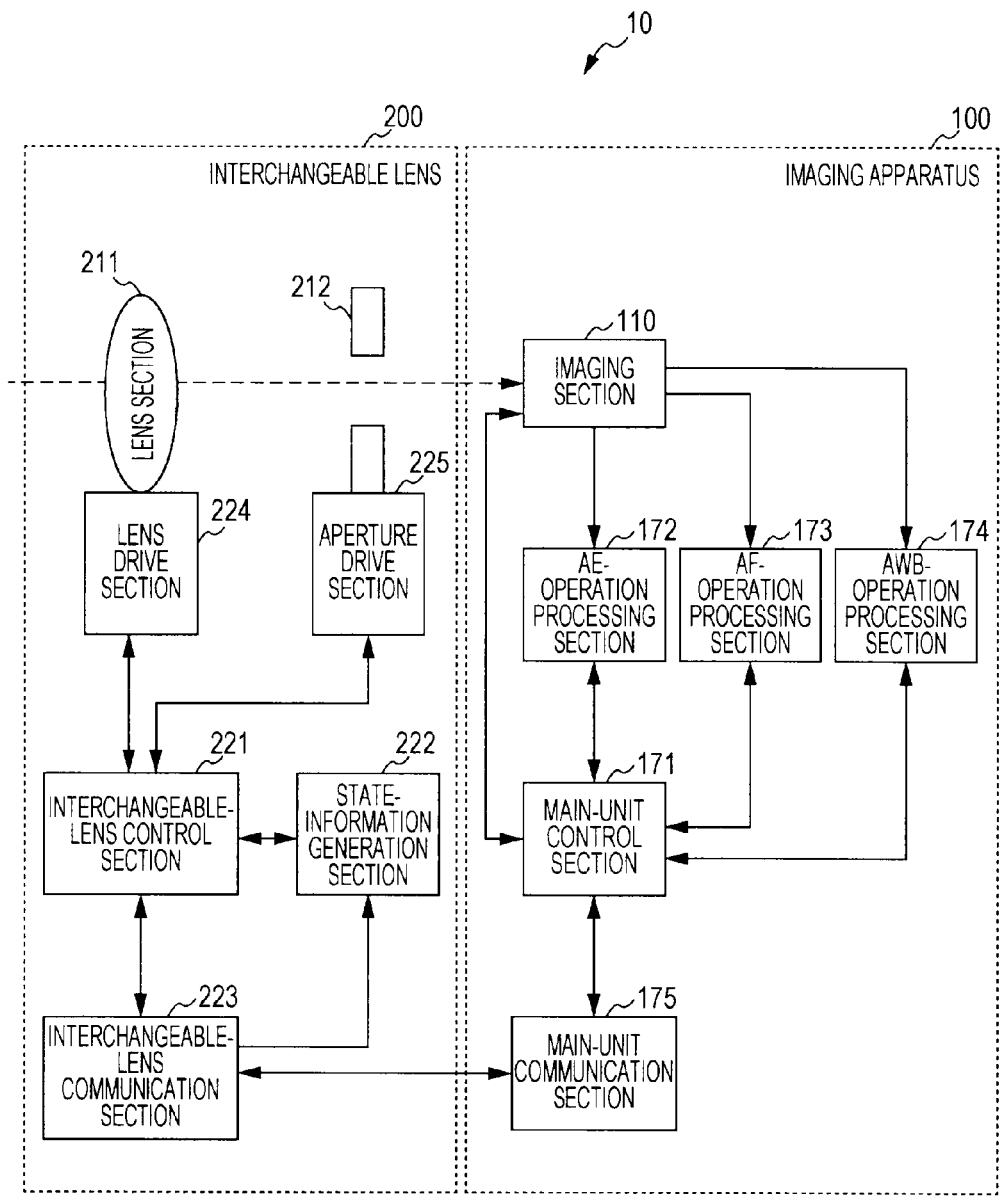
FIG. 2 is a block diagram illustrating an example of a functional configuration of the imaging system according to the first embodiment of the present invention.

FIG. 2 is a block diagram illustrating an example of a configuration of an imaging system 10 according to the first embodiment of the present invention. The imaging apparatus 100 includes an imaging section 110, a main-unit control section 171, an AE-operation processing section 172, an AF-operation processing section 173, an AWB-operation processing section 174, and a main-unit communication section 175. In this regard, the imaging section 110 corresponds to the shutter 111, the shutter control section 112, the imaging device 113, the imaging control section 114 and the CPU 170 shown in FIG. 1. Also, the main-unit control section 171, the AE-operation processing section 172, the AF-operation processing section 173, the AWB-operation processing section 174, and the main-unit communication section 175 correspond to the CPU 170 shown in FIG. 1.

Also, the interchangeable lens 200 includes a lens section 211, an aperture 212, an interchangeable-lens control section 221, a state-information generation section 222, an interchangeable-lens communication section 223, a lens drive section 224, and an aperture drive section 225. In this regard, the lens section 211 and the aperture 212 correspond to the lens section 211 and the aperture 212 shown in FIG. 1, respectively. Also, the interchangeable-lens control section 221, the state-information generation section 222, the interchangeable-lens communication section 223, the lens drive section 224, and the aperture drive section 225 correspond to the interchangeable-lens control section 220 shown in FIG. 1.

The imaging section 110 captures an image of a subject to generate image data (an image signal) under the control of the main-unit control section 171. The imaging section 110 supplies the generated image data to the AE-operation processing section 172, the AF-operation processing section 173, and the AWB-operation processing section 174. In this regard, in FIG. 2, functional configurations on recording processing recording the image data generated by the imaging section 110 and display processing displaying the image data are not shown in the figure and descriptions thereof are omitted.

The main-unit control section 171 controls each section of the imaging apparatus 100, and performs communication control with the interchangeable lens 200. For example, the main-unit control section 171 controls to transmit request information including a transmission request of state information and prediction information to be used by each operation processing, and a drive request for controlling each member included in the interchangeable lens 200 on the basis of operation results of each operation processing to the interchangeable lens 200. Here, the state information is information illustrating the current state of each member included in the interchangeable lens 200 (a position of each lens (a focus lens, etc.) included in the lens section 211, an aperture value of the aperture 212). Also, the prediction information is state information of each member at a predetermined time period ahead. For example, the prediction information is state information on a position of each lens included in the lens section 211 after a predetermined time period, and state information on an aperture value of the aperture 212 after a predetermined time period. The predetermined time period related to the prediction information is determined, for example, on the basis of timing of each operation processing and receiving timing of the state information.

Also, for example, when the main-unit control section 171 makes a transmission request, the main-unit control section 171 determines whether to make a transmission request of the prediction information, or to make a transmission request of the state information for each operation processing on the basis of timing of each operation processing in a synchronization period of the synchronous communication and the receiving timing of the state information. And the main-unit control section 171 makes a transmission request of the prediction information or the state information on the basis of the determination result. In this regard, the main-unit control section 171 is an example of the first control section and the control section described in claims.

The AE-operation processing section 172 performs various kinds of operation processing (auto-exposure operation processing) for AE processing under the control of the main-unit control section 171. The AE-operation processing section 172 outputs an operation result to the main-unit control section 171. In this regard, the AE processing is processing that calculates a shutter speed and an aperture value in accordance with a subject luminance to automatically determine an exposure condition.

The AF-operation processing section 173 performs various kinds of operation processing (auto-focus operation processing) for AF processing under the control of the main-unit control section 171, and outputs a calculation result to the main-unit control section 171. In this regard, the AF processing is processing that automatically controls driving of the lens in accordance with a distance to the subject.

The AWB-operation processing section 174 performs various kinds of operation processing (auto-white-balance operation processing) for AWB processing, and outputs an operation result to the main-unit control section 171. In this regard, the AWB processing is automatic color-measuring processing that measures a color temperature of a subject or a light source, determines a gain for each color (R, G, B), and automatically performs best suited color reproduction processing.

Also, each operation processing section (from 172 to 174) performs operation processing for controlling each member included in the interchangeable lens 200 on the basis of the image data generated by the imaging section 110 and the state information (prediction information) transmitted from the interchangeable lens 200. That is to say, each operation processing section (from 172 to 174) performs operation processing on the image data generated by the imaging section 110. In this regard, the AE-operation processing section 172, the AF-operation processing section 173 and the AWB-operation processing section 174 are one example of the operation processing section described in claims. Also, the AE-operation processing section 172 is an example of the first operation processing section described in claims. Also, the AF-operation processing section 173 and the AWB-operation processing section 174 are one example of the second operation processing section described in claims.

The main-unit communication section 175 performs communication with the interchangeable-lens communication section 223 under the control of the main-unit control section 171. For example, the main-unit communication section 175 performs synchronous communication with the interchangeable-lens communication section 223 under the control of the main-unit control section 171. In initialization processing in the synchronous communication, for example, time information including a predetermined time period related to the prediction information is transmitted from the imaging apparatus 100 to the interchangeable lens 200. In this regard, the main-unit communication section 175 is an example of the first communication section and the communication section described in claims.

The lens section 211 condenses incident light from the subject, and supplies the incident light to the imaging section 110 through the aperture 212. Each lens included in the lens section 211 is driven by the lens drive section 224, and moves forward and backward with respect to the subject. Thereby, a focusing function and a zoom function are achieved.

The aperture 212 adjusts the amount of the incident light passing through the lens section 211 to determine the amount of light supplied to the imaging section 110 (That is to say, exposure), and supplies the incident light to the imaging section 110. The aperture 212 is driven by the aperture drive section 225, and adjusts the opening of the aperture. In this regard, the lens section 211 and the aperture 212 are one example of the member described in claims.

The interchangeable-lens control section 221 controls the lens drive section 224 and the aperture drive section 225 on the basis of the drive request included in the request information received by the interchangeable-lens communication section 223. Also, the interchangeable-lens control section 221 obtains a position of each lens included in the lens section 211 through the lens drive section 224, and obtains a state (an open/close state) of the aperture 212 through the aperture drive section 225. And the interchangeable-lens control section 221 outputs the obtained position of each lens and the state (state information) of the aperture 212 to the state-information generation section 222. Also, the interchangeable-lens control section 221 transmits the obtained position of each lens, the state (state information) of the aperture 212, and the prediction information generated by the state-information generation section 222 to the imaging apparatus 100 through the interchangeable-lens communication section 223 in response to the transmission request from the imaging apparatus 100. In this regard, the interchangeable-lens control section 221 is an example of the second control section and the control section described in claims.

The state-information generation section 222 generates state information (prediction information) of each member included in the interchangeable lens 200 at a predetermined time period ahead, and outputs the generated prediction information to the interchangeable-lens control section 221. For example, the state-information generation section 222 generates prediction information on each lens on the basis of the position of each lens output from the interchangeable-lens control section 221 and a drive request included in the request information received by the interchangeable-lens communication section 223. Also, the state-information generation section 222 generates prediction information on the aperture 212 on the basis of the state of the aperture 212 output from the interchangeable-lens control section 221, and the drive request included in the request information received by the interchangeable-lens communication section 223. The prediction information is generated, for example, on the basis of a predetermined time period related to the transmission request (a transmission request of prediction information) included in the request information received by the interchangeable-lens communication section 223, and the state information output from the interchangeable-lens control section 221. In this regard, the state-information generation section 222 is an example of the calculation section described in claims.

The interchangeable-lens communication section 223 performs communication with the main-unit communication section 175 under the control of the interchangeable-lens control section 221. For example, the interchangeable-lens communication section 223 performs synchronous communication with the main-unit communication section 175 under the control of the interchangeable-lens control section 221. In this regard, the interchangeable-lens communication section 223 is an example of the second communication section and the communication section described in claims.

The lens drive section 224 drives each lens included in the lens section 211 under the control of the interchangeable-lens control section 221. Also, the lens drive section 224 obtains a position of each lens included in the lens section 211, and outputs the position to the interchangeable-lens control section 221.

The aperture drive section 225 drives the aperture 212 under the control of the interchangeable-lens control section 221. Also, the aperture drive section 225 obtains a state (an open/close state) of the aperture 212, and outputs the state to the interchangeable-lens control section 221.

An example of communication processing and operation processing between imaging apparatus and interchangeable lens (an example in which operation processing timing is later than receiving timing of state information)

Figure 3:
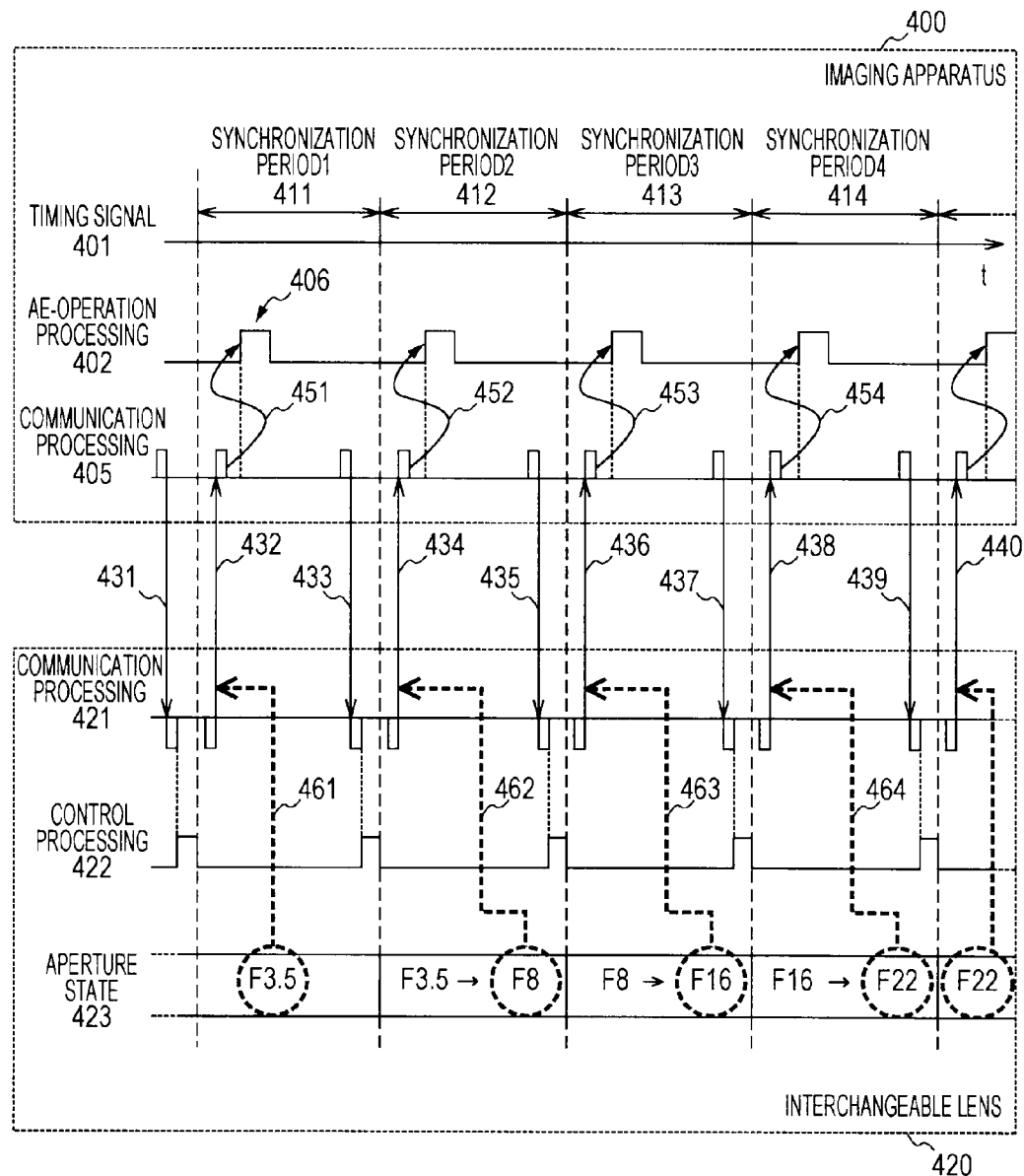
FIG. 3 is a diagram illustrating a timing chart of each processing in the imaging system according to the first embodiment of the present invention.

FIG. 3 is a diagram illustrating a timing chart of each processing of the imaging system 10 according to the first embodiment of the present invention. FIG. 3 illustrates a timing chart on the communication processing between the imaging apparatus 100 and the interchangeable lens 200, and the AE operation processing in the imaging apparatus 100. In this regard, in the example shown in FIG. 3, a description will be given of the case where time constraint between the operation processing and the communication processing is defined, and a before-and-after relationship between the communication processing and the operation processing is fixed. Also, in the example shown in FIG. 3, it is assumed that initialization processing (initial recognition processing) of the imaging apparatus 100 and the interchangeable lens 200 have been completed, and normal communication processing is performed in accordance with a format.

In the initialization processing, it is recognized whether or not an attached interchangeable lens is an interchangeable lens capable of communication conforming to a communication format guaranteed by the imaging apparatus 100, and necessary information for performing synchronous communication between the imaging apparatus 100 and the interchangeable lens is exchanged. For the information necessary for the synchronous communication, for example, detecting an ID of the interchangeable lens, and exchanging specification of the interchangeable lens, and a drive frequency for synchronization are carried out.

Here, if state information (prediction information) of each member (aperture in the example shown in FIG. 3) included in the interchangeable lens at a predetermined time period ahead becomes necessary, it is possible to transmit the predetermined time period in accordance with a format at communication time in the initialization processing from the imaging apparatus 100 to the interchangeable lens. In this case, in the initialization processing, time at which aperture-state information should be predicted (read-ahead time) is transmitted from the imaging apparatus 100 to the interchangeable lens. Also, when communication of a request including a read-ahead time and response is carried out, and when suitable initialization processing is performed, normal synchronous communication processing is started from the next synchronization timing signal.

Also, the predetermined time period may be included in the request information transmitted from the imaging apparatus 100 to the interchangeable lens 200 for each synchronization period, and the predetermined time period may be transmitted from the imaging apparatus 100 to the interchangeable lens 200 for each synchronization period. From FIG. 3 to FIG. 5, examples of transmitting the predetermined time period from the imaging apparatus 100 to the interchangeable lens 200 for each synchronization period are shown.

Also, in FIG. 3, a description will be given by taking, as an example, the case where timing of AE operation processing in a synchronization period is later than receiving timing of the state information from the interchangeable lens 200. In this manner, when timing of AE operation processing in a synchronization period is later than receiving timing of the state information, the imaging apparatus 100 makes a transmission request requesting the interchangeable lens 200 to transmit current state information (that is to say, read-ahead time 0). Also, the interchangeable lens 200 transits the current state information to the imaging apparatus 100 in response to the transmission request.

Also, in the imaging apparatus 100, each processing (AE operation processing 402, and communication processing 405 with the interchangeable lens 200) evoked intermittently is scheduled in synchronism with the timing signal 401. Accordingly, in the imaging apparatus 100, the AE operation processing 402 and the communication processing 405 are performed in accordance with the timing signal 401. In this regard, in FIG. 3, each processing in the imaging apparatus 100 is shown by being enclosed by a dotted-line rectangle 400. Also, in the interchangeable lens 200, the communication processing 421 and the control processing 422 are performed in accordance with the timing signal 401. Also, a state of the aperture 212 to be controlled by the control processing 422 is shown by an aperture value (F-number) as an aperture state 423. In this regard, each processing in the interchangeable lens 200 is shown by being enclosed by a dotted-line rectangle 420. Also, in FIG. 3, for the sake of simple description, an example in which only state information (F-number) on the aperture 212 is used for the AE operation processing 402 is shown.

In FIG. 3, a description will be given by taking, as an example, the case where a state of having an F-number of F3.5 is assumed to be an initial state of the aperture 212, and this state is kept. In this case, as shown by a dotted-line arrow 461, the interchangeable lens 200 transmits the current state information (current F-number=F3.5) in response to request information 431 from the imaging apparatus 100. In this manner, AE operation processing 402 (shown by an arrow 406) in the synchronization period 1 (411) is performed using the transmitted state information. In this regard, the AE operation processing 402 is performed by the AE-operation processing section 172.

Here, in the AE operation processing 402 (shown by the arrow 406) in synchronization 1 (411), it is assumed that the aperture 212 is closed to a state of F22 (F-number). In this case, request information 433 including a drive request for driving the aperture 212 to the state of F22 (F-number) and a transmission request for transmitting the next state information (state information of 0 period ahead) is transmitted in the communication processing 405. That is to say, as a result of the AE operation processing 402 in the imaging apparatus 100, request information 433 including a drive request for driving each member included in the interchangeable lens 200 is transmitted from the communication processing 405 in the imaging apparatus 100 through the communication processing 421 of the interchangeable lens 200.

Next, when the request information 433 from the imaging apparatus 100 is received in the communication processing 421, the control processing 422 performs various kinds of operations in response to the drive request included in the request information 433. Specifically, the interchangeable-lens control section 221 calculates the amount of driving the aperture 212 on the basis of the drive request included in the request information 433 for each synchronization period. For example, in the case of controlling the aperture 212 to the state of F22 (F-number), a determination is made of moving from F3.5 to F8 in the synchronization period of one period ahead (synchronization period 2 (412): the next synchronization period). Also, a determination is made of moving from F8 to F16 in the synchronization period of two periods ahead (synchronization period 3(413)), and moving from F16 to F22 in the synchronization period of three periods ahead (synchronization period 4 (414)). The various kinds of operations in response to the drive request are performed by the state-information generation section 222.

Also, in the control processing 422 performed in the synchronization period 1 (411), device control is scheduled in order to carry out the drive request included in the request information 433. And state information 434 is transmitted to the imaging apparatus 100 in communication processing 421 at the beginning of the synchronization period 2 (412).

That is to say, after the timing signal 401 for generating a synchronization period 2 (412) is output, the communication processing 421 of the interchangeable lens 200 is evoked. The communication processing 421 includes processing for collecting state information on a state of each member included in the interchangeable lens 200. Also, at the end of the communication processing 421, communication between the interchangeable lens 200 and the imaging apparatus 100 occurs, and the communication processing 405 from the interchangeable lens 200 to the imaging apparatus 100 are evoked. Also, in the communication processing 421 in the synchronization period 2 (412), as the state information 434 to be transmitted to the imaging apparatus 100, the state information of the synchronization period (synchronization period 2 (412)) at this transmission time is transmitted. That is to say, in the communication processing 421 in the synchronization period 2 (412), the state information of the synchronization period (synchronization period 2 (412)) is transmitted as state information 434. In FIG. 3, an F-number corresponding to the state information to be transmitted is enclosed by a dotted-line circle, and the state information to be transmitted from the dotted-line circle is denoted by an arrow 462.

Also, as shown by an arrow 452, AE operation processing 402 is performed using the state information 434 (current F-number=F8) transmitted from the interchangeable lens 200 to the imaging apparatus 100. That is to say, the AE operation processing is performed using the F-number in the synchronization period.

After that, in the same manner, in the communication processing 421, the state information in the synchronization period is transmitted as the state information 436, 438, and 440. Also, in FIG. 3, F-numbers corresponding to the state information to be transmitted is enclosed by dotted-line circles, and state information to be transmitted from the dotted-line circles is denoted by arrows 462 to 464. Also, as shown by arrow 453 and 354, AE operation processing 402 is performed using the state information 436, 438, and 440 (current F-numbers=F16, F22, and F22) transmitted from the interchangeable lens 200 to the imaging apparatus 100. That is to say, AE operation processing is performed using the F-number in the synchronization period.

In this manner, on the basis of the drive request received by the interchangeable lens 200 from the imaging apparatus 100, the amount of drive after the synchronization period next to the synchronization period at this reception time is determined for each synchronization period. Accordingly, if state information of a predetermined period ahead is requested, it is possible to transmit the state information. In this regard, when state information of a predetermined period ahead is requested, examples of transmitting the state information are shown in FIG. 4 and FIG. 5.

Example of communication processing between imaging apparatus and interchangeable lens, and operation processing (an example in which timing of operation processing is earlier than receiving timing of state information)

Figure 4:
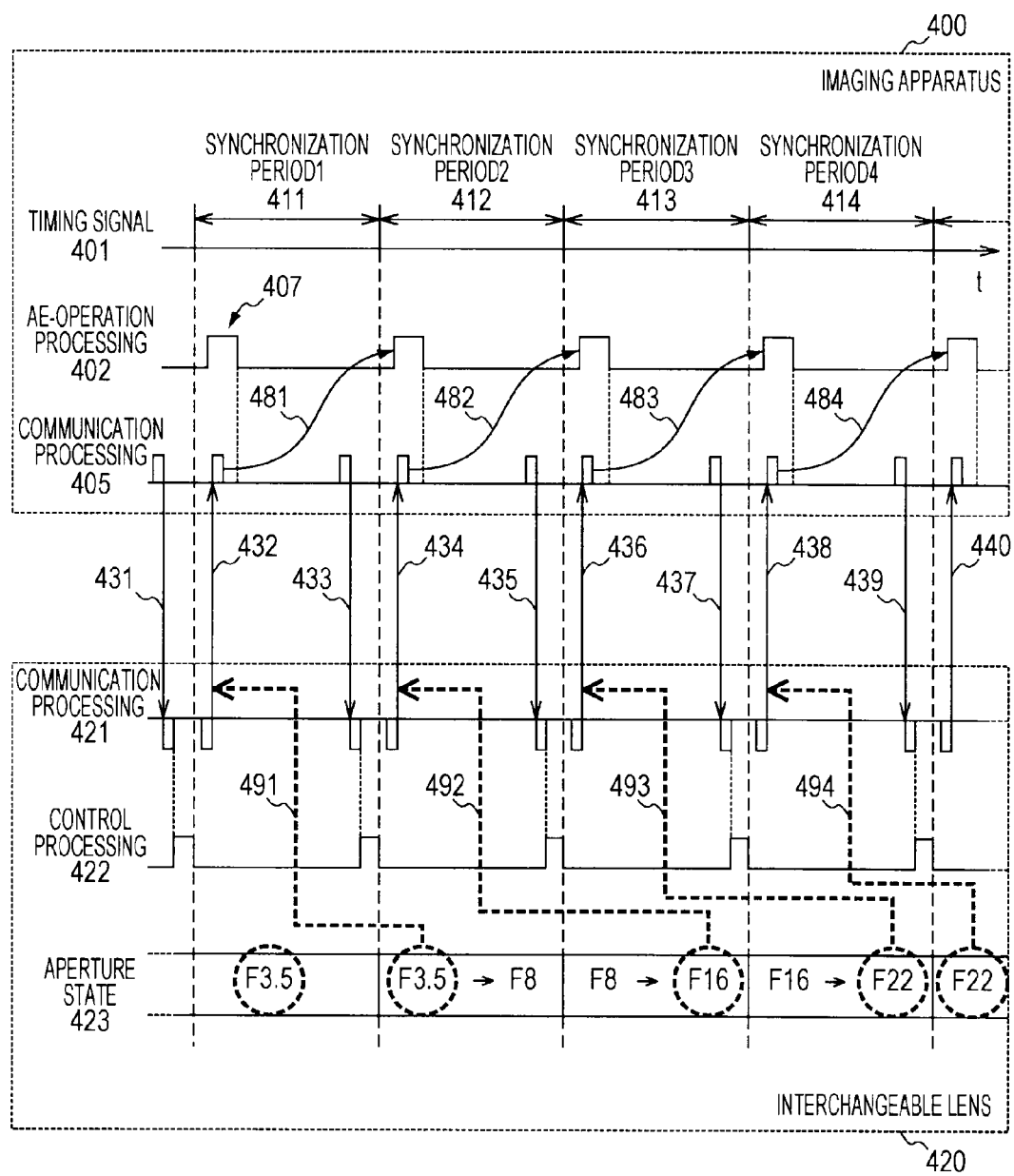
FIG. 4 is a diagram illustrating a timing chart of each processing in the imaging system according to the first embodiment of the present invention.
Figure 5:
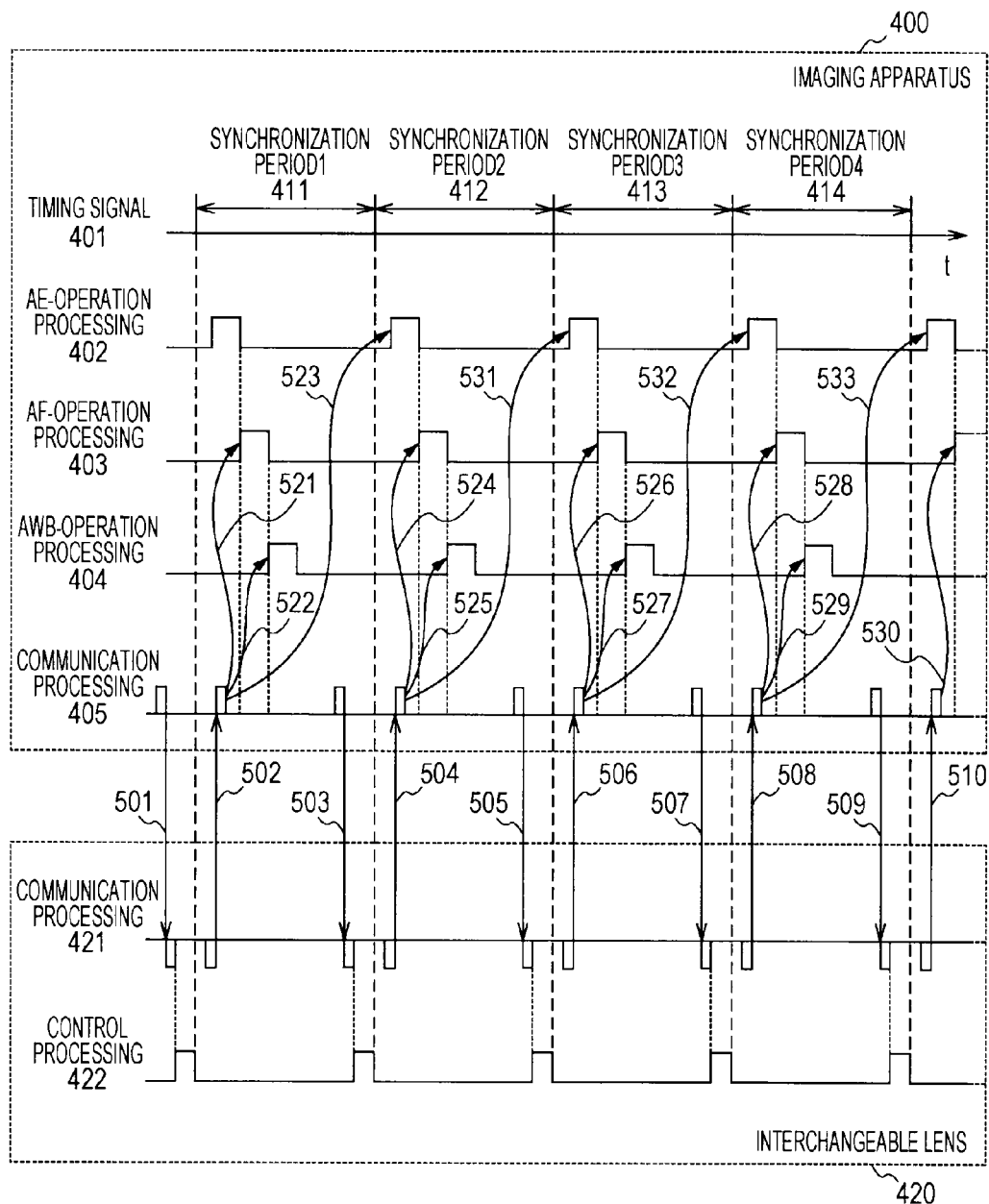
FIG. 5 is a diagram illustrating a timing chart of each processing in the imaging system according to the first embodiment of the present invention.

FIG. 4 is a diagram illustrating a timing chart of each processing in the imaging system 10 according to the first embodiment of the present invention. In FIG. 4, a description will be given by taking, as an example, the case where timing of AE operation processing in a synchronization period is earlier than receiving timing of state information from the interchangeable lens 200. In this manner, if the timing of the AE operation processing is earlier than the receiving timing of the state information in a synchronization period, the imaging apparatus 100 makes a transmission request requesting transmission of the state information (prediction information) of a predetermined time period ahead to the interchangeable lens 200. Also, in response to the transmission request, the interchangeable lens 200 transmits the state information of a predetermined time period ahead to the imaging apparatus 100. In the example shown in FIG. 4, an example of transmitting the state information of one synchronization period ahead as the state information (prediction information) of a predetermined time period ahead is shown. In this regard, the example shown in FIG. 4 is substantially the same as that in FIG. 3 except that timing of the AE operation processing in a synchronization period and the state information (prediction information) transmitted from the interchangeable lens 200 to the imaging apparatus 100 are different. Accordingly, same reference numerals are given to portions common to FIG. 3, and part of the description thereof will be omitted.

In FIG. 4, in the same manner as FIG. 3, a description will be given by taking, as an example, the case where a state of having an F-number of F3.5 is set as an initial state of the aperture 212, and the state is maintained. In the initial state, at the time of transmitting state information 43, the state information in the synchronization period of one period ahead is the same as the current state information (current F-number=F3.5). Accordingly, as shown by a dotted-line arrow 491, in response to request information 431 (including a transmission request of state information) from the imaging apparatus 100, the state information (one-period ahead F-number=F3.5) 432 of one period ahead is transmitted from the interchangeable lens 200 as prediction information. That is to say, the aperture state 423 in the synchronization period 2 (412) is changed in response to the request information 433. However, at the time of transmitting state information 432, the change has not been determined, and thus the same state information as the current state information (current F-number=F3.5) is transmitted as prediction information. In this manner, the AE operation processing 402 (shown by an arrow 481) in the synchronization period 2 (412) is performed using the transmitted state information (prediction information). In this regard, in the AE operation processing 402 (shown by an arrow 407) in the synchronization period 1 (411), the AE operation processing is performed using the state information (prediction information) received in the synchronization period immediately before.

Here, in the AE operation processing 402 (shown by an arrow 407) in the synchronization period 1 (411), it is assumed that the aperture 212 is determined to be closed until the state of F22 (F-number). In this case, request information 433 including a drive request for driving the aperture 212 and a transmission request for transmitting the next state information (state information of one-period ahead) until the state of F22 (F-number) is transmitted by the communication processing 405.

Next, when the request information 433 is received from the imaging apparatus 100 by the communication processing 421, in the control processing 422, various kinds of operations are performed in response to the drive request included in the request information 433. That is to say, in the same manner as an example shown in FIG. 3, the amount of movement of each period is determined. That is to say, the amount of movement in the synchronization period of one period ahead (synchronization period 2 (412): movement from F3.5 to F8) is determined. Also, the amount of movement in the synchronization period of two periods ahead (synchronization period 3 (413): movement from F8 to F16) and the amount of movement in the synchronization period of three periods ahead (synchronization period 4 (414): movement from F16 to F22) are determined.

That is to say, in the communication processing 421 in the synchronization period 2 (412), the state information (F-number=F16) of the synchronization period (synchronization period 3 (413)) of one period ahead is transmitted as the as the state information 434 to be transmitted to the imaging apparatus 100. In FIG. 4, an F-number corresponding to the state information to be transmitted is enclosed by a dotted-line circle, and the state information to be transmitted from the dotted-line circle is denoted by an arrow 492. Also, in the imaging apparatus 100, the AE operation processing 402 in the synchronization period 2 (412) is evoked, and the AE operation processing 402 is started while the communication processing 421 is performed.

In this manner, the AE operation processing 402 is started, and thus the latest state information is not received in the synchronization period at the time of starting. Accordingly, it is not possible for the AE operation processing 402 to use the state information obtained in the same synchronization period triggered by the same timing signal 401. However, for example, it is possible for the AE operation processing 402 in the synchronization period 3 (413) to use the state information (state information of the synchronization period of one period ahead) 434 obtained at the beginning of the synchronization period 2 (412). In this manner, it is possible for AE operation processing 402 in each synchronization period to use suitable state information by obtaining the state information of the synchronization period of one period ahead. That is to say, as shown by an arrow 482, the AE operation processing 402 is performed using the state information 434 (F-number=F16 received one period before) transmitted from the interchangeable lens 200 to the imaging apparatus 100. That is to say, the AE operation processing is performed using the F-number in the synchronization period.

After that, in the same manner, in communication processing 421, the state information of the synchronization period of one period ahead is transmitted as state information 436, 438, and 440. Also, in FIG. 4, F-numbers corresponding to the state information to be transmitted are enclosed by dotted-line circles, and the state information to be transmitted from the dotted-line circles are denoted by arrows 492 to 494. Also, as shown by arrows 483 and 384, the AE operation processing 402 is performed using the state information 436, 438, 440 (F-numbers=F16, F22, and F22 received one period before) transmitted from the interchangeable lens 200 to the imaging apparatus 100. That is to say, the AE operation processing is performed using the F-number in the synchronization period.

Example of communication processing between imaging apparatus and interchangeable lens, and operation processing (an example in which multiple operation processing is performed in a synchronization period)

In FIG. 3 and FIG. 4, examples are illustrated in which only the AE operation processing is performed as operation processing in the imaging apparatus 100. However, when the imaging apparatus 100 is performing imaging operation, multiple operation processing is often performed in each synchronization period. Thus, in FIG. 5, a description will be given of the case where multiple operation processing is performed in each synchronization period.

FIG. 5 is a diagram illustrating a timing chart of each processing in the imaging system 10 according to the first embodiment of the present invention. FIG. 5 illustrates a timing chart on the communication processing between the imaging apparatus 100 and the interchangeable lens 200, and the AE operation processing, the AF operation processing, and the AWB operation processing in the imaging apparatus 100. In this regard, in the example shown in FIG. 5, a description will be given of the case where the order of operation processing and time constraint of the communication processing are defined, and a before-and-after relationship between the communication processing and the operation processing is fixed. Also, in the example shown in FIG. 5, it is assumed that initialization processing (initial recognition processing) of the imaging apparatus 100 and the interchangeable lens 200 have been completed, and normal communication processing is performed in accordance with a format.

Here, a description will be given of processing order of the AE operation processing 402, the AF operation processing 403, and the AWB operation processing 404. For example, if image data (captured image) generated by the imaging section 110 becomes pure white or deep black, it is assumed that there will be a great impact on each processing performed after that. Thus, it is preferable to perform the AE operation processing 402 first among the three kinds of operation processing. Also, it is preferable to perform AF at a high speed. Accordingly, the priority of AF is set high, and thus it is preferable to perform the AF operation processing 403 next to the AE operation processing 402. Also, if the other operation processing is often changed, it might give a great impact on the imaging processing. Thus, it is preferable to perform the AWB operation processing 404 last among the three kinds of operation processing. In this regard, the order of each operation processing shown in this example is only one example. It is possible to apply the first embodiment of the present invention to the cases where the order of each processing is changed. Also, the AF operation processing 403 is performed by the AF-operation processing section 173, and the AWB operation processing 404 is performed by the AWB-operation processing section 174.

Also, in FIG. 5, a description will be given by taking, as an example, the case where timing of the AE operation processing 402 in a synchronization period is earlier than receiving timing of the state information, and timing of the other operation processing is later than receiving timing of the state information. In this manner, in the case of performing operation processing earlier than receiving timing of the state information in a synchronization period, and performing the other operation processing later than receiving timing of the state information, transmission requests are made in accordance with timing of each operation processing.

That is to say, for the AE operation processing 402, which is performed earlier than receiving timing of the state information in a synchronization period, the imaging apparatus 100 makes a transmission request of the state information (prediction information) of a predetermined time period ahead to the interchangeable lens 200. On the other hand, for the operation processing (the AF operation processing 403 and the AWB operation processing 404), which are performed later than receiving timing of the state information in a synchronization period, the imaging apparatus 100 makes a transmission request of the current state information to the interchangeable lens 200. Also, in response to the transmission request, the interchangeable lens 200 transmits the state information (prediction information) of a predetermined time period ahead or the current state information to the imaging apparatus 100.

In this regard, the example shown in FIG. 5 is substantially the same as that shown in FIG. 4 except that the AF operation processing 403 and the AWB operation processing 404 are additionally performed in a synchronization period. Accordingly, same reference numerals are given to portions that are common with those in FIG. 4, and part of the descriptions thereof are omitted.

Also, in the imaging apparatus 100, each processing (each operation processing of the AE operation processing 402, the AF operation processing 403, and the AWB operation processing 404, and the communication processing 405 with the interchangeable lens 200) evoked intermittently is scheduled in synchronism with the timing signal 401.

In FIG. 5, request information 501 includes a drive request for driving the lens section 211 and the aperture 212 on the basis of the operation result of each operation processing in the synchronization period of one period before the synchronization period 1 (411) and a transmission request for transmitting the next state information. Here, the transmission requests included in the request information 501 are transmission requests of the transmission of the state information (prediction information) of the synchronization period of one period ahead and the transmission of the state information of the current synchronization period. Specifically, the transmission requests are transmission requests requesting transmission of the state information (prediction information) of the synchronization period of one period ahead as the state information used for the AE operation processing 402, and transmission of the state information of the current synchronization period as the state information used for the AF operation processing 403 and the AWB operation processing 404.

In this manner, a transmission request is made of the state information (prediction information) of the synchronization period of one period ahead as the state information used for the operation processing performed earlier than receiving timing of the state information in a synchronization period. On the other hand, a transmission request is made of the state information of the current synchronization period as the state information used for the operation processing performed later than receiving timing of the state information.

In this manner, the state information 502 is transmitted from the interchangeable lens 200 in response to the request information 501 from the imaging apparatus 100. Specifically, the state information 502 includes the state information (state information of the synchronization period of one period ahead (prediction information)) used by the AE operation processing 402, and the state information (state information of the current synchronization period) used for the AF operation processing 403 and the AWB operation processing 404.

Here, at the time of receiving the state information 502, the AE operation processing 402 has been already started. Thus, the AE operation processing 402 uses the state information received in the synchronization period of one period before the synchronization period 1 (411). On the other hand, the AF operation processing 403 and the AWB operation processing 404 are started after the state information 502 is received. Accordingly, as shown by arrows 521 and 522, the AF operation processing 403 and the AWB operation processing 404 use the state information 502 received in the synchronization period 1 (411). Also, as shown by an arrow 523, the state information 502 received in the synchronization period 1 (411) is used by the AE operation processing 402 in the synchronization period 2 (412).

The AF operation processing 403 and the AWB operation processing 404 (shown by arrows 521 and 522) are performed using the transmitted state information 502 (current state information) in this manner in the synchronization period 1 (411). Also, the AE operation processing 402 (shown by an arrow 523) in the synchronization period 2 (412) is performed using the state information 502 (state information of the synchronization period of one period ahead (prediction information)). That is to say, in the AE operation processing 402, the operation processing is performed using the state information (state information of the synchronization period of one period ahead (prediction information)) in the synchronization period of one period before. Accordingly, in the AE operation processing 402, it is possible also to perform operation processing using the current state information in the synchronization period.

After that, in the same manner, in the communication processing 421, the state information 504, 506, 508, and 510, which includes the state information (prediction information) used for the AE operation processing 402, and the state information (current state information) used for the AF operation processing 403 and the AWB operation processing 404 are transmitted. The state information includes the state information (state information of the synchronization period of one period ahead (prediction information)) used for the AE operation processing 402, and the state information (state information of the current synchronization period) used for the AF operation processing 403 and the AWB operation processing 404.

Also, as shown by arrows 524 to 530, the AF operation processing 403 and the AWB operation processing 404 are performed using the state information 504, 506, 508, and 510 (the state information received in the synchronization period), which has been transmitted from the interchangeable lens 200 to the imaging apparatus 100. Also, as shown by arrows 531 to 533, the AE operation processing 402 is performed using the state information 504, 506, 508, and 510 (the state information received one period before), which has been transmitted from the interchangeable lens 200 to the imaging apparatus 100. That is to say, the AE operation processing 402, the AF operation processing 403, and the AWB operation processing 404 are performed using the state information in the synchronization period.

Thereby, it is possible to perform high-speed AE control, which reads ahead the device information (the state information of the interchangeable lens 200).

In this regard, in the examples shown from FIG. 3 to FIG. 5, a description has been given of examples in which tasks evoked in one synchronization period are scheduled in advance, and a before-and-after relationship between the operation processing and the communication processing in each synchronization period is not changed. However, the before-and-after relationship between the operation processing and the communication processing in each synchronization period may be changed in time. If the relationship is changed in this manner, when request information (a drive request and a transmission request) is transmitted to the interchangeable lens 200, information on the state information (prediction information) to be received by the imaging apparatus 100 is included in the communication processing immediately after. For example, the transmission request includes time information indicating the amount of time necessary for the predicted state information (prediction information) to be received by the imaging apparatus 100, and a kind of state information (a position of a lens, an aperture value, etc.) to be used for the operation processing related to this time information. In this manner, even if a before-and-after relationship in time between the operation processing and the communication processing in each synchronization period is changed, it is possible to perform the operation processing using suitable state information in each synchronization period by transmitting the request information in accordance with the change.

Also, in the example shown in FIG. 5, the example of the case where the AE operation processing 402 is evoked earlier than the completion of the communication processing 405. However, the embodiment of the present invention can also be applied to the case where the AE operation processing 402 is evoked after the AF operation processing 403 and the AWB operation processing 404. In this case, for example, the AF operation processing 403 may be evoked earlier than the completion of the communication processing 405. Also, not only one operation processing, but also a plurality of or all of the operation processing may be scheduled before the receiving timing of the state information from the interchangeable lens 200.

Also, the examples shown from FIG. 3 to FIG. 5 are the cases where one set of two-way communication is performed between the communication processing (the communication processing of the imaging apparatus 100) 405 and the communication processing (the communication processing of the interchangeable lens 200) 421 in a synchronization period. However, there may be a plurality of timings at which communication is performed between the communication processing 405 and the communication processing 421 in a synchronization period. Also, two-way communication may be completed in same communication processing.

Example of Operation of Imaging Apparatus

Next, a description will be given of operation of the imaging apparatus 100 according to the first embodiment of the present invention with reference to the drawings.

Figure 6:
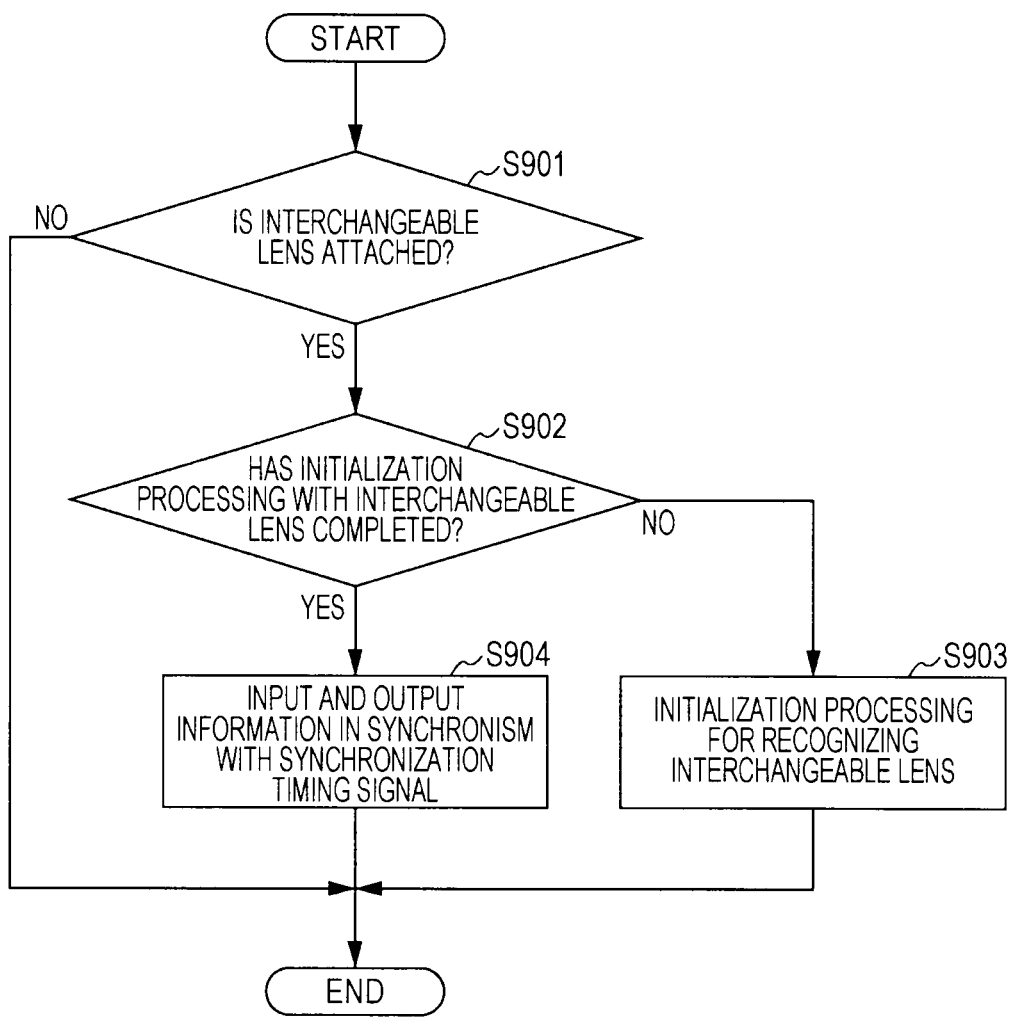
FIG. 6 is a flowchart illustrating an example of a processing procedure of communication processing by the imaging apparatus according to the first embodiment of the present invention with an interchangeable lens.

FIG. 6 is a flowchart illustrating an example of a processing procedure of communication processing performed by the imaging apparatus 100 according to the first embodiment of the present invention with an interchangeable lens. In this processing procedure, an example of performing synchronous communication is shown. Also, the processing procedure is performed, for example, for each synchronization period. Further, in the processing procedure, an example in which time information including a predetermined time period (read-ahead time) related to reservation information is transmitted in the initialization processing.

First, a determination is made of whether an interchangeable lens is attached or not by an interface to be a connection point with the interchangeable lens (step S901). If an interchangeable lens is not attached (step S901), the operation of the communication processing is terminated. Here, when an interchangeable lens is attached, if the attached interchangeable lens is not an interchangeable lens that is recognizable, a determination is made that an interchangeable lens is not attached, and the operation of the communication processing is terminated.

If an interchangeable lens is attached (step S901), a determination is made of whether initialization processing between the imaging apparatus 100 and the interchangeable lens has been completed or not (step S902). If the initialization processing between the imaging apparatus 100 and the interchangeable lens has not been completed (step S902), the initialization processing is performed (step S903). In this regard, step S903 is one example of a requesting procedure described in claims.

In the initialization processing, first, whether or not the attached interchangeable lens is an interchangeable lens that is capable of communication conforming to a communication format guaranteed by the imaging apparatus 100 is recognized. And, if the attached interchangeable lens is an interchangeable lens capable of communication conforming to a communication format guaranteed by the imaging apparatus 100, information necessary for performing communication between the imaging apparatus 100 and the interchangeable lens is exchanged. The information necessary for synchronous communication includes, for example, detection of an ID of an interchangeable lens, specification of the interchangeable lens, and drive frequency at the time of synchronization. Also, when it becomes necessary to get the state information (prediction information) of a predetermined time period ahead of each member (a lens and an aperture) included in the interchangeable lens, the predetermined time period is transmitted from the imaging apparatus 100 to the interchangeable lens in accordance with the format at communication time in the initialization processing. That is to say, time information including time (read-ahead time) to predict the state information of each member (a lens and an aperture) included in the interchangeable lens is transmitted from the imaging apparatus 100 to the interchangeable lens. Also, when communication of a request including a read-ahead time and a reply is performed, and suitable initialization processing is performed, normal synchronous communication processing is started from the next synchronization timing signal. In this regard, if the attached interchangeable lens is not an interchangeable lens capable of communication conforming to a communication format guaranteed by the imaging apparatus 100, the operation of the communication processing is terminated in the same manner as the case in which an interchangeable lens is not attached.

Also, if an interchangeable lens is attached (step S901), and initialization processing between the imaging apparatus 100 and the interchangeable lens has been completed (step S902), the communication processing is performed (step S904). That is to say, the communication processing is performed between the imaging apparatus 100 and the interchangeable lens in synchronism in accordance with the synchronization timing signal, and synchronization is (step S904). In this communication processing, communication is performed in order to control each member (a lens and an aperture) included in the interchangeable lens in real time. For example, in this communication processing, information, such as a drive instruction of the aperture, a drive instruction of the zoom lens, a drive instruction of camera-shake compensation mechanism, etc., is communicated. That is to say, in the same manner as the examples shown from FIG. 3 to FIG. 5, request information including a transmission request of the state information (the prediction information) and a drive request is transmitted from the imaging apparatus 100 to the interchangeable lens, and the state information (prediction information) in response to the transmission request is transmitted from the interchangeable lens to the imaging apparatus 100. In this regard, time information including read-ahead time has been transmitted from the imaging apparatus 100 to the interchangeable lens at the time of initialization processing, and thus for a transmission request transmitted for each synchronization period may not include the time information. Also, the interchangeable lens performs drive control of each member in response to a drive request included in the received request information. In this regard, step S904 is the calculation step and the transmitting step described in claims.

In FIG. 6, an example has been shown in which on the basis of the time information (read-ahead time) transmitted from the imaging apparatus 100 to the interchangeable lens at the time of initialization processing, the state information (prediction information) corresponding to the read-ahead time is transmitted in the subsequent synchronous communication processing. However, a determination is made of whether the prediction information is transmitted or not for each synchronization period, and the state information (prediction information) may be transmitted on the basis of the determination result. Examples of this communication processing are shown in FIG. 7 and FIG. 8.

Figure 7:
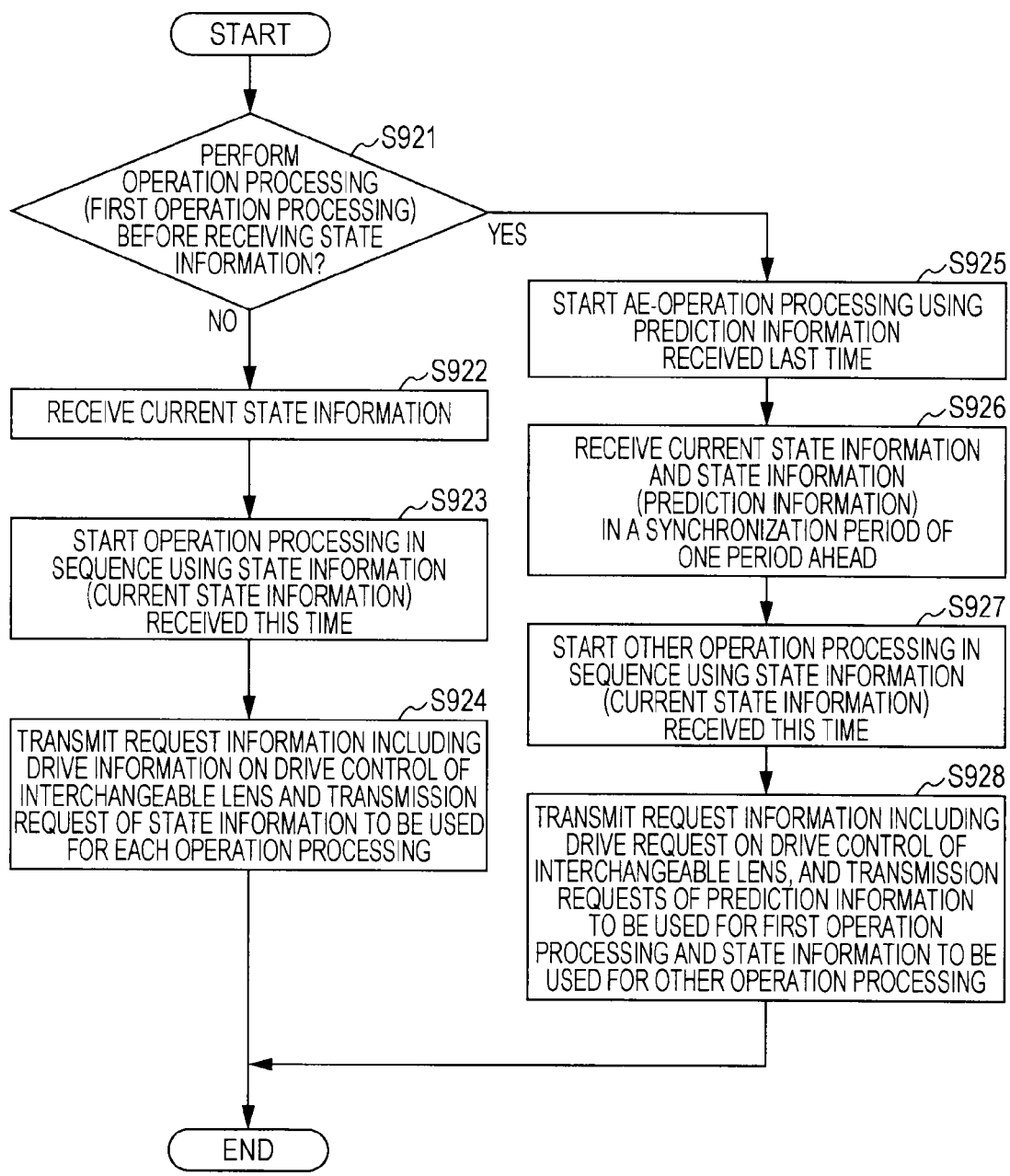
FIG. 7 is a flowchart illustrating an example of a processing procedure of communication processing by the imaging apparatus according to the first embodiment of the present invention with an interchangeable lens.

FIG. 7 is a flowchart illustrating an example of a processing procedure of communication processing by an imaging apparatus 100 according to the first embodiment of the present invention with an interchangeable lens. In the processing procedure, an example of synchronous communication is shown. Also, the processing procedure is performed, for example, for each synchronization period. Further, in the processing procedure, an example is shown in which a determination is made of whether there is transmission request of the prediction information for each synchronization period, and the state information (prediction information) is transmitted on the basis of the determination result.

First, in a synchronization period, a determination is made of whether there is operation processing (first operation processing) to be started before receiving the state information (step S921). For example, in the example shown in FIG. 5, in a synchronization period, the AE operation processing 402 is performed at earlier timing than the receiving of the state information by the communication processing 405, and thus a determination is made that there is the first operation processing.

If there is no operation processing (the first operation processing) to be started before receiving the state information (step S921) in the synchronization period, the current state information is received (step S922). And, operation processing using the state information (the current state information) received this time is started in sequence (step S923).

Next, request information including a drive request for driving each member (a lens, an aperture, etc.) included in the interchangeable lens, and a transmission request of the state information to be used by each operation processing in the next synchronization period is transmitted to the interchangeable lens (step S924). In this regard, the drive request included in the request information is generated on the basis of the calculation result of each operation processing.

Also, in the synchronization, if there is operation processing (first operation processing) before receiving the state information (step S921), first operation processing using the state information (prediction information) received in the synchronization period of one period before is started in sequence (step S925). In this regard, in the synchronization period, if there is multiple operation processing to be started before receiving the state information, each operation processing is started in sequence in accordance with a predetermined order.

Next, the current state information and the state information (the prediction information) of the synchronization period of one period ahead are received (step S926). Here, the prediction information is the state information to be used for the first operation processing in the synchronization period of one period ahead. Next, operation processing (excluding the first operation processing) using the state information (the current state information) received this time is started in sequence (step S927).

Next, request information including a drive request for driving each member (a lens, an aperture, etc.) included in the interchangeable lens and a transmission request of the state information to be used for each operation processing in the next synchronization period is transmitted to the interchangeable lens (step S928). Here, the transmission request included in the request information includes a transmission request of the state information (prediction information) to be used for the first operation processing in the next synchronization period, and a transmission request of the state information (the current state information) to be used for the other each operation processing in the next synchronization period. In this regard, step S928 is an example of requesting procedure in claims.

Also, in the example FIG. 7, the example has been shown in which a determination is made of whether there is operation processing (first operation processing) to be started before receiving the state information first in the synchronization period. However, at the time of transmitting request information in the synchronization period, a determination may be made of whether operation processing (first operation processing) to be started before receiving the state information in the next synchronization period. If the determination is made at the time of transmitting the request information in this manner, a transmission request (a transmission request of the state information) included in the request information is determined on the basis of the determination result. Thereby, each operation processing can be performed using more suitable state information.

FIG. 8 is a flowchart illustrating an example of a processing procedure of communication processing of the interchangeable lens 200 according to the first embodiment of the present invention with the imaging apparatus. In the processing procedure, an example of synchronous communication is shown. Also, the processing procedure is performed, for example, for each synchronization period. Further, in the processing procedure, an example is shown in which a determination is made of whether there is transmission request of the prediction information for each synchronization period, and the state information (prediction information) is transmitted on the basis of the determination result.

First, a determination is made of whether request information transmitted from the imaging apparatus includes a transmission request of the prediction information (step S931). If a transmission request of the prediction information is not included in the request information transmitted from the imaging apparatus (step S931), the state information of the synchronization period at transmission time is transmitted to the imaging apparatus (step S932).

Next, request information including a drive request for driving each member (a lens, an aperture, etc.) included in the interchangeable lens, and a transmission request of the state information to be used for each operation processing in the next synchronization is received (step S936). In this regard, the transmission request included in the request information includes at least one of the transmission request of the state information (the prediction information) to be used for the first operation processing in the next synchronization period, and a transmission request of the state information (the current state information) to be used by the other each operation processing in the next synchronization.

Next, drive operation of each member (a lens, an aperture, etc.) is performed on the basis of the drive request included in the received request information (step S937). Next, the state information of each member is calculated for each synchronization period on the basis of the operation result of the drive operation (step S938). In this manner, drive control of each member is performed on the basis of the calculated state information of each calculated member for each synchronization period. In this regard, step S937 and step S938 are an example of a calculating step described in claims.

Also, if the transmission request of the prediction information is included in the request information transmitted from the imaging apparatus (step S931), a determination is made of whether the transmission request includes only a transmission request of the prediction information (step S933). If the transmission request includes only a transmission request of the prediction information (step S933), the state information in the synchronization period corresponding to the transmission request is transmitted to the imaging apparatus as reservation information (step S934). Here, if the transmission request of the prediction information is a plurality of transmission requests, each state information in the synchronization period corresponding to each transmission request is transmitted as reservation information.

Also, if the transmission request includes not only a transmission request of the prediction information (step S933), the state information (reservation information) in the synchronization period corresponding to the transmission request, and the state information in the synchronization period at transmission time are transmitted to the imaging apparatus (step S935). In this case, the state information corresponding to each transmission request or the reservation information is transmitted in response to the transmission request. In this regard, step S934 and step S935 are an example of the transmitting step described in claims.

2. Second Embodiment

In the first embodiment of the present invention, an example in which each processing is performed in synchronism with the communication between the imaging apparatus and the interchangeable lens. However, the first embodiment of the present invention can be applied to the case where the communication between the imaging apparatus and the interchangeable lens is not performed in synchronism. Thus, in a second embodiment, a description will be given by taking, as an example, the case where an interruption task temporarily occurs, or a synchronization interval changes, or the like. In this regard, the configuration of an imaging system according to the second embodiment of the present invention is substantially the same as the configurations of the examples shown in FIG. 1 and FIG. 2. Accordingly, same reference numerals are given to portions common to the first embodiment of the present invention, and part of the descriptions thereof will be omitted.

For example, in the case where the communication between the imaging apparatus 100 and the interchangeable lens 200 is not performed in synchronism, when the imaging apparatus 100 transmits request information to the interchangeable lens 200, operation processing that makes a transmission request of the prediction information is identified. For example, using receiving timing of the state information as reference time, operation processing that is not included in a certain range including the reference time (a range in a time axis) is identified. And on the basis of a time difference between the reference time and the identified operation processing, a predetermined time period (read-ahead time) related to the prediction information is calculated. And a transmission request (transmission request of the prediction information) including the calculated predetermined time period and information (for example, an aperture value and a position of a lens) on the state information to be used for the identified operation processing is made from the imaging apparatus 100 to the interchangeable lens 200. Also, the calculation processing of the predetermined time period is performed for each transmission request of the prediction information.

In this manner, by the embodiment of the present invention, for example, when the communication processing between the imaging apparatus 100 and the interchangeable lens 200 is performed in synchronism, it is possible to perform operation processing before receiving the state information from the interchangeable lens 200 in the synchronization period. In the operation processing, it is possible to use the state information received in the previous synchronization period, and at the same time, the state information (the prediction information) corresponding to the synchronization period, and thus it is possible to perform suitable operation processing using the state information. Also, it is possible to perform one or a plurality of operation processing regardless of the timing of the communication processing receiving the state information from the interchangeable lens 200, and thus it is possible to effectively use time in the synchronization period.

Here, it is assumed that communication processing between the imaging apparatus 100 and the interchangeable lens 200 is not performed in synchronism. Even in this case, it is possible for the imaging apparatus 100 to make a request of the state information with the timing necessary for each operation processing to the interchangeable lens, and to obtain the state information (the prediction information) in response to the request from the interchangeable lens 200. Accordingly, it is possible for each operation processing to perform suitable operation processing using the suitable state information. Also, it is possible to perform one or a plurality of operation processing regardless of the timing of the communication processing receiving the state information from the interchangeable lens 200, and thus it is possible to effectively use time in the synchronization period.

In this manner, by an embodiment of the present invention, even if each device (interchangeable lens 200) attached to the imaging apparatus 100 is operating independently, it is possible for the control section of the imaging apparatus 100 to easily grasp future behavior of a part of or all of each member included in the device.

Also, by an embodiment of the present invention, while communication processing is performed with the interchangeable lens 200, it is possible for the imaging apparatus 100 to perform operation processing that necessitates the state information from the interchangeable lens 200, and thus the communication processing and the operation processing can be performed in the imaging apparatus 100 at the same time. Accordingly, it is possible to efficiently use both of the processing time. As a result, it is possible to efficiently perform communication processing between the interchangeable lens 200 and the imaging apparatus 100, and each operation processing using the state information obtained thereby.

Also, it is possible to suitably obtain the state information of the interchangeable lens 200 in accordance with each operation processing at shooting operation time.

That is to say, by an embodiment of the present invention, after the imaging apparatus 100 makes a drive request to the interchangeable lens 200, it is not necessary for the imaging apparatus 100 to wait for the completion of the drive and then to make the next drive request, and thus it is possible to follow a change of a subject at a high speed. Also, even if an interruption task temporarily occurs, or an interval of the synchronization periods changes, etc., and thereby an interval of operation processing in the imaging apparatus 100 is changed, it is possible to make a drive request in anticipation of a period of not evoking the operation processing.

Also, even if scheduling of tasks is dynamically changed, it is possible to make a request to the interchangeable lens 200 so that latest state information necessary for each operation processing can be obtained. Accordingly, predictive control can be performed while following the movement of each member included in the interchangeable lens 200, and thus new control can be performed without waiting for the completion of operation of each member included in the interchangeable lens 200. Also, it is possible to predict driving of each member included in the interchangeable lens 200, and thus optimum control can be performed electrically and in time.

Also, it is possible to predict that each member included in the interchangeable lens 200 is driven in the future, and thus it is possible to restrain driving of the other accessories in order to perform electronically exclusive processing. Also, it is possible to obtain a time period during which devices related to an amount of light and image quality stop moving, and thus it is possible to instruct the other processing to be performed during that time period. Accordingly, it is possible to improve processing speed of the imaging system 10.

In this regard, in the embodiments of the present invention, descriptions have been given of an example of the interchangeable lens 200 including the lens section 211 and the aperture 212. However, the embodiments of the present invention can be applied to an interchangeable lens including the other members, such as a camera-shake compensation mechanism, etc.

Also, in the embodiments of the present invention, descriptions have been given by taking, as an example, the case of attaching an interchangeable lens to the imaging apparatus as an accessory (device). However, the embodiments of the present invention may be applied to, for example, the other accessories that are capable of mutual communication with the imaging apparatus.

In this regard, an embodiment of the present invention is only an example shown in order to embody the present invention. As clarified in the embodiments of the present invention, items in the embodiments of the present invention and specific inventive items in claims have corresponding relationships individually. In the same manner, specific inventive items in claims and the items having identical names thereto in the embodiments of the present invention have corresponding relationships individually. However, the present invention is not limited to the embodiments, and various variations of the embodiments may be made without departing from the spirit and scope of the present invention.

Also, the processing procedures described in the embodiments of the present invention may be grasped as a method having a series of these procedures. Also, the processing procedures may be grasped as a recording medium storing programs for causing a computer to perform the series of these procedures. For the recording medium, for example, a CD (Compact Disc), an MD (MiniDisc), a DVD (Digital Versatile Disk), a memory card, a Blu-ray Disc (registered trademark), etc., can be used.

The present application contains subject matter related to that disclosed in Japanese Priority Patent Application JP 2010-122232 filed in the Japan Patent Office on May 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system, comprising:
an imaging apparatus circuitry configured to:
perform communication with an interchangeable lens, and transmit a transmission request of prediction information of a future state of a member included in the interchangeable lens, wherein the interchangeable lens includes a focus lens and an aperture as the member, the prediction information being state information on a state on a position of the focus lens and an aperture value of the aperture of the member, the state information related to the future state of the member after a predetermined time period in the future; and
the interchangeable lens including circuitry configured to:
perform communication with the imaging apparatus,
obtain the current state information from the member and calculate the prediction information on the basis of the obtained state information and the predetermined time period, and
control transmission of the calculated prediction information to the imaging apparatus.

2. The imaging system according to claim 1,
wherein the imaging apparatus further includes circuitry configured to:
capture an image of a subject and generate image data,
perform operation processing for controlling the member on the basis of the generated image data and the state information,
determine the predetermined time period on the basis of timing of the operation processing and receiving timing of the prediction information,
transmit the transmission request of the prediction information related to the determined predetermined time period, and
transmit a drive request for controlling the member on the basis of an operation result by the operation processing.

3. The imaging system according to claim 1,
wherein the circuitry of the imaging apparatus and the circuitry of the interchangeable lens are configured to perform synchronous communication.

4. The imaging system according to claim 3,
wherein time information including the predetermined time period is transmitted from the imaging apparatus to the interchangeable lens by initialization processing by the imaging apparatus and the interchangeable lens, and
the circuitry of the interchangeable lens is configured to calculate the prediction information on the basis of the obtained state information and the predetermined time period included in the transmitted time information.

5. The imaging system according to claim 1,
wherein the circuitry of the imaging apparatus and the circuitry of the interchangeable lens are configured to perform synchronous communication, the circuitry of the imaging apparatus is further configured to:
  capture an image of a subject and generate image data,
  start first operation processing on the generated image data generated by the imaging section before receiving timing of the prediction information using the state information in a synchronization period by the synchronous communication,
  start second operation processing on the generated image data after the receiving timing of the prediction information using the state information in the synchronization period by the synchronous communication,
  transmit a transmission request of prediction information being the state information related to a synchronization period of one period ahead for obtaining the state information to be used in the first operation processing, and
  transmit a transmission request for obtaining the state information to be used in the second operation processing, and
the circuitry of the interchangeable lens is further configured to:
  transmit the calculated prediction information and the obtained state information to the imaging apparatus in response to the transmission requests.

6. The imaging system according to claim 5,
wherein the circuitry of the imaging apparatus is further configured to:
perform auto-exposure operation processing as the first operation processing, and
perform at least one of auto-focus operation processing and auto-white-balance operation processing as the second operation processing.

7. An imaging apparatus, comprising:
circuitry configured to:
perform communication with an interchangeable lens to be connected;
capture an image of a subject and generate image data;
perform operation processing on the generated image data using current state information received from the interchangeable lens, the state information being on a state of a member included in the interchangeable lens, wherein the interchangeable lens includes a focus lens and an aperture as the member;
  transmit a transmission request of prediction information of a future state of the member, the prediction information being the state information to be used for the operation processing and state information related to a position of the focus lens and an aperture value of the aperture the future state of the member after a predetermined time period in the future; and
  transmit a drive request for controlling the member on the basis of an operation result of the operation processing.

8. An interchangeable lens, comprising:
a member including a lens and an aperture; and
circuitry configured to:
perform communication with an imaging apparatus to be connected, and receive a transmission request of prediction information of a future state of the member, the prediction information being state information on a state on a position of the focus lens and an aperture value of the aperture of the member after a predetermined time period in the future;
obtain the current state information from the member and calculate the prediction information on the basis of the obtained state information and the predetermined time period; and
transmit the calculated prediction information to the imaging apparatus.

9. A method of controlling an imaging system, comprising:
requesting, using circuitry, transmission of prediction information of a future state of a member included in an interchangeable lens attached to an imaging apparatus, wherein the interchangeable lens includes a focus lens and an aperture as the member, the prediction information being state information on a state of the member, the state information related to a position of the focus lens and an aperture value of the aperture of the member after a predetermined time period in the future;
obtaining, using the circuitry, the current state information from the member and calculating, using the circuitry, the prediction information on the basis of the obtained state information and the predetermined time period; and
transmitting, using the circuitry, the calculated prediction information from the interchangeable lens to the imaging apparatus.

10. A non-transitory computer readable storage medium having executable instructions stored therein, which when executed by a processor in an imaging system, causes the processor:
request, using circuitry, transmission of prediction information of a future state of a member included in an interchangeable lens attached to an imaging apparatus, wherein the interchangeable lens includes a focus lens and an aperture as the member, the prediction information being state information on a state of the member, the state information related to the future state a position of the focus lens and an aperture value of the aperture of the member after a predetermined time period in the future;
obtain, using the circuitry, the current state information from the member and calculate, using the circuitry, the prediction information on the basis of the obtained state information and the predetermined time period; and
transmit, using the circuitry, the calculated prediction information from the interchangeable lens to the imaging apparatus.

* * * * *